June 4, 1940.  H. BROWN  2,203,293

FORCE MEASURING DEVICE

Filed April 28, 1939

Inventor
Hart Brown

By Dallas R. Lamont
Attorney

Patented June 4, 1940

2,203,293

UNITED STATES PATENT OFFICE 2,203,293

FORCE MEASURING DEVICE

Hart Brown, Houston, Tex.

Application April 28, 1939, Serial No. 270,520

2 Claims. (Cl. 265—1.5)

This invention relates to apparatus for measuring forces and particularly to apparatus for measuring such minutely varying forces as those due to gravity. The particular improvement to which this invention is specifically directed is a device for calibrating instruments of this type.

A gravity-meter is essentially a device consisting of a suitable arrangement of a weight, M, suspended on a spring and a provision for observing minute deviations of the total spring deflection as a measure of variations of gravitational pulls. It is often necessary to measure deviations of the order of 0.0000001 of the total spring deflection, but is not necessary to measure the total deflection at all. Calibration consists of determining the ratio between the deviation of the total deflection and the change in gravity which caused that deviation. This may be done by adding a small weight $m$ to the main weight M and noting the resulting deviation of the spring.

In Patent No. 2,125,282, granted to this same inventor on August 2, 1938, a force measuring device is described which device consists of a mass bifilarly supported by torsional elements so that the rotational position of the mass is an indication of the force applied.

In a device of this kind it is necessary, in order to make accurate determinations, to enclose the device in a carefully heat insulated chamber in which the temperature is quite constant and no condition other than that to be measured is permitted to affect the instrument. Even under such conditions the sensitivity of the instrument varies from time to time due to exhaustion of the torsional elements and other unavoidable changes and for this reason it is necessary at times to determine the sensitivity of the device, or in other words to calibrate the device.

Since the surrounding enclosure has some effect on the device and its sensitivity and since the sensitivity of the device changes with the temperature and may be changed by other conditions such as the proximity of magnetic bodies and the like it has heretofore been an extremely difficult task to determine the sensitivity of the instrument under the conditions of actual use. Even though this sensitivity is once determined it frequently changes when the device is moved from one location to another and hence a correct calibration at one location may be considerably in error when the device is moved to another location.

According to the present invention, means are provided for calibrating the device at any time and wherever located, without the necessity of removing the device from its enclosure or changing its temperature or in any way affecting its operation.

Various means for calibrating gravity-meters are in use, among which are the following:

1. By computation from the known physical constants of the elements of the instrument, such as, (a) by observing the period of oscillation of the mass, (b) by observing the deflection of the instrument resulting from a known deviation of the instrument from its level position, and (c) by the use of a small calibrating mass.

2. By comparing the instrument's response to known gravity differences, such as, (a) by noting the instrument's response to change in elevation, and (b) by comparison with gravity values determined by some other gravity-meter or other gravity measuring device, such as a torsion balance or pendulum.

Calibrating a gravity-meter by the use of a calibrating mass is absolute and is dependent only upon knowing the values of the masses M and $m$, to the same degree of accuracy to which the calibration is desired.

This method has obvious advantages over others listed by virtue of its simplicity, its accuracy, and its dependence only upon knowing quantities which are easily measured and which remain constant.

In gravimetric measurements it is convenient to use as a unit of force, one ten-millionth of the weight of one gram mass. Thus, if M, the total suspended mass of the gravity-meter, is one gram, and the calibrating mass $m$ is one milligram, then when the instrument scale is observed with the mass $m$ lifted, and again observed with the mass $m$ added to the mass M, the change in deflection of the instrument is then 10,000 units. Since the scale of most gravity-meters is non-linear, it is often desirable that the calibrating interval should be appreciably less than 10,000 units. Hence, unless the mass M can be made of the order of 100 grams or more the calibrating mass $m$ should be of the order of 1 milligram or less. To obtain a mass of 1 milligram or less in such a form that it can be added to or subtracted from the mass M by remote control from the outside of the case of the gravity-meter is the prime object of this invention. There is obvious advantage in the use of a straight short bar for this purpose, which bar, in reality may be a very tiny wire or fiber weighing only a few hundredths of a milligram.

In a general way this improvement consists in a means on the suspended mass to receive and support such a small weight and a means operable through the enclosure wall to place this small weight on the supporting means and remove it therefrom without either supporting or depressing the weight while it is on the supporting means but so arranged that the small weight cannot escape or be dropped by accident.

Since instruments of this kind are commonly moved from place to place, particularly if they are used in geophysical prospecting, it is highly important that the small calibrating weight be so held that it cannot escape or be dropped to the bottom of the enclosure for the instrument. Such an occurrence would necessitate entering the enclosure, thus changing the temperature of the instrument and possibly also mechanically disturbing it. This is highly undesirable with a sensitive instrument that must be fully protected in order to obtain accurate determinations.

In order that the details of this invention may be thoroughly understood, reference may be had to the appended drawing and to the following detailed description of one embodiment thereof, in which like numerals denote like parts.

In the drawing is shown a gravity-meter embodying the principles of this invention. Figure 1 is a diagrammatic showing of the parts of the inside of the gravity-meter which are essential to an understanding of this invention.

Figure 1:
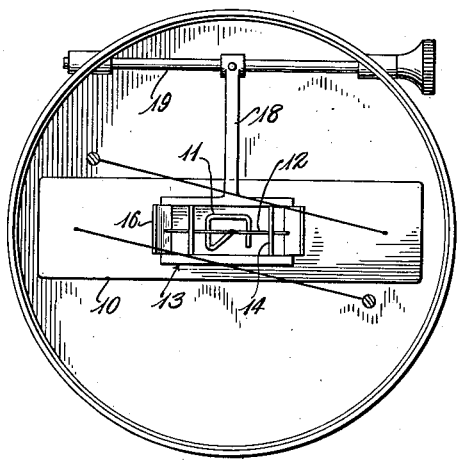

As shown in Figure 1, the support which receives the calibrating weight may be in the nature of a bent wire 11 and fixed to the suspended mass 10. The wire is of such shape that it will receive and support the calibrating weight. Since the suspended mass rotates in a horizontal plane it is usually best to have the support present a straight horizontal portion upon which to receive the calibrating weight for this will permit a plurality of angular positions relative to the suspended mass without any tendency for the calibrating weight to change positions, such as it would have if it were received in a trough shaped support, and thus lie against the member that places it on the support and removes it therefrom. As shown in Figure 1 the calibrating weight 12 may consist of a short length of wire. This piece of wire may be bent slightly if desired so that it will not tend to roll on the support 11.

Figure 3:
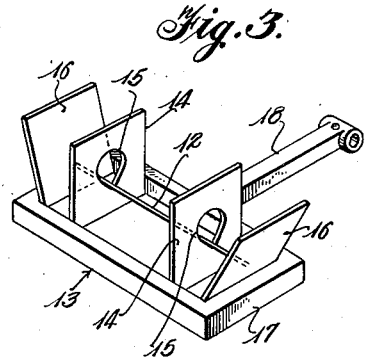
Figure 3 is a perspective view of the cradle or carrier by which the calibrating weight is placed on the support and removed therefrom.
Figure 2:
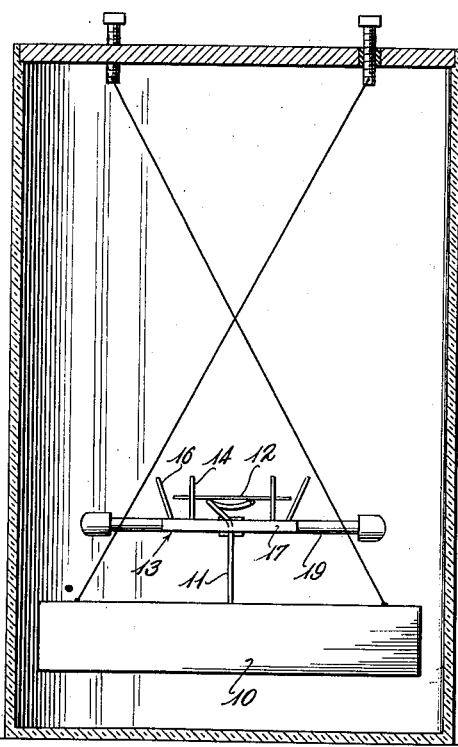
Figure 2 is a sectional elevation of the device shown in Figure 1.

A cradle or carrier 13 is provided to place the calibrating weight 12 on the support 11 and to move it therefrom. This cradle may take any one of a number of forms but it has been found particularly desirable to have the cradle so designed that it will be completely free from contact with the calibrating weight when the weight is on the supporting member 11 and yet will so hold the weight that it cannot possibly escape therefrom. As shown in detail in Figures 2 and 3, this may be accomplished by using as a support for the calibrating weight two plates 14, each having an opening 15 in it to receive the weight, and two end plates 16 which prevent the weight from slipping out of the openings. The openings 15 are large enough so that when the plates are lowered to the proper position the calibrating weight will be suspended somewhere in the middle of the openings and will not touch the plates. Preferably, also, the openings 15 are V shaped at their bottoms so that the calibrating weight always rests in the bottoms of the V's when it is supported by the plate and hence is always placed on the support 11 in exactly the same position. Preferably also the end plates 16 are inclined inwardly from top to bottom so that when the calibrating weight rests in the bottom of the openings 15 it is centered therein axially by the end plates and yet when it is lifted from the bottom of the openings 15 by the support 11 the ends thereof are completely free of the end plates 16. Thus the calibrating weight is always brought back to exactly the same place in the cradle when it is picked up and always placed on the supporting member 11 in exactly the same manner and yet it is entirely free of the cradle or carrier when it is in use as a calibrating weight.

The plates 14 and 16 may all be carried by a frame 17 which in turn may be carried by an arm 18 attached to a rotatable rod 19 which passes through the enclosure for the instrument and may be operated from the outside to cause the calibrating weight to be brought into action or removed from contact with the support 11. Stops may be advantageously arranged to position the cradle or carrier in just the right place to allow the calibrating weight to operate without any contact with the plates 14 or 16 and to hold the carrier in another position in which the calibrating weight will be out of the way and have no effect on the instrument. The cradle may be raised or lowered by any kind of mechanism whatever, and still fall within the scope of this invention, or it may be raised and lowered by rotation through a small arc about a horizontal axis as shown in the diagrams or about a horizontal axis normal to the present one.

The particular form of cradle or carrier shown has been found to be highly advantageous and more desirable than any other form at present devised, and for that reason its specific form is an essential part of this invention. However, the broader concept of the invention includes such other forms of cradle as may be included within the definitions of the claims and is not limited to this particular form.

I claim:

1. In a device of the type described having a main mass, the improvement that comprises an elongated calibrating weight, means to add the calibrating weight to the main mass of the device and to remove it therefrom, said means including a member for positioning said calibrating weight in the desired position on the main mass, which member can be entirely freed from contact with the calibrating weight when it is on the main mass, but which is arranged to so surround the calibrating weight at all times that the calibrating weight cannot escape therefrom and will always be returned to the same position in the grasp thereof when it is lifted thereby from the main mass, said member having a pair of upwardly diverging plates positioned so as to contact the ends of said calibrating weight when it is lifted by said members, to position said calibrating weight axially.

2. In a device of the type described having a main mass, the improvement that comprises an elongated calibrating weight, means to add the calibrating weight to the main mass of the device and to remove it therefrom, said means including a member for positioning said calibrating weight in the desired position on the main mass, which member can be entirely freed from contact with the calibrating weight when it is on the main mass, but which is arranged to so surround the calibrating weight at all times that the calibrating weight cannot escape therefrom and will always be returned to the same position in the grasp thereof when it is lifted thereby from the main mass, said member having a pair of upwardly diverging plates positioned so as to contact the end of said calibrating weight when it is lifted by said members, to position said calibrating weight axially, and said member also including a pair of plates having openings therein to receive said calibrating weight so as to position it laterally, said openings being V-shaped on their lower edges so as to more accurately position said calibrating weight.

HART BROWN.